United States Patent Office 2,706,187
Patented Apr. 12, 1955

2,706,187

PROCESS OF GRINDING ORGANO-POLYSILOXANE GELS IN THE PRESENCE OF A SOLVENT

Clément Joseph Guillissen, Uccle-Brussels, and Abraam Gancberg, Forest-Brussels, Belgium, assignors to Union Chimique Belge Societe Anonyme, Brussels, Belgium, a Belgian company No Drawing. Application October 30, 1951, Serial No. 253,978

Claims priority, application Belgium October 31, 1950

3 Claims. (Cl. 260—33.6)

The present invention relates to a process of preparing varnishes from organo-polysiloxanes.

It is known that organo-polysiloxanes from which these varnishes are made, comprise a structure of macro-molecules which are essentially unstable. By their continuous polymerisation these macro-molecules finally form a mass which is stable, hard and smooth. The polymerisation process may be accelerated by various means, in particular by heating. In the liquid state the varnishes represent, essentially, a cololidal solution of organo-polysiloxanes which are already strongly polymerised, though still unstable, in an appropriate solvent. When applied onto the surface to be protected, these varnishes must be subjected to a final operation, usually a baking operation, in order to remove the solvent and to carry the polymerisation to its final stage. A varnish is all the more appreciated, the more the period of instability of the organo-polysiloxanes is prolonged and the final polymerisation is accelerated. The first of these conditions permits of keeping the varnish in the liquid state for a long time without any important alteration of its properties, more particularly of its viscosity, while the second condition makes the final operation easier. A further desirable quality of varnishes is the faculty of forming layers of most uniform thickness, even if they are not kept in the horizontal position before and during the baking. Obviously this quality depends largely on the viscosity of the liquid varnish, but it is also obvious that the stability of the liquid varnish is dependent on the possibility of increasing the quantity of solvent for a given viscosity, that is of maintaining the varnish in a more dilute state.

The object of the present invention is to provide a process which will permit of obtaining varnishes from organo-polysiloxanes having, for a given content of solvent, a very high degree of viscosity, or adapted, for a given viscosity, to support a greater quantity of solvent. The baking of such varnishes is more rapid and the quotient of the thickness of the films at the top and bottom of a vertical surface is improved and tends towards $l$. Our improved process is based on observation of the fact that a gel containing an organo-polysiloxane in the unstable form and a solvent is transformed into a liquid by intimate grinding and such liquid possesses the properties of an improved varnish as stated above.

In the following, this transformation from the state of gel into a cololidal solution is called "degelification." The phenomenon is known in itself but heretofore it has not, so far as we are aware, found any technical application in the industry of organo-polysiloxanes.

The grinding of a gel of organo-polysiloxanes and solvent may be effected by means of a colloidal mill, a turbine agitator, a roller grinder or any equivalent grinding means.

In order to improve an organo-polysiloxane varnish having a given content of organo-silicic material and a given viscosity, we first remove the solvent by distillation, then the organo-polysiloxane resin is heated for several hours at a temperature equal to, or greater than, that at which the resin was formed. This heating results in increasing the degree of polymerisation of the organo-polysiloxane. Consequently the latter loses the faculty of dissolving in the solvent to form a colloidal solution. It however absorbs the solvent and thereby forms a gel. By subjecting the gel to degelification, a liquid varnish is obtained which, for an identical quantity of solvent, shows a greater viscosity than that of the initial varnish. In order to restore the initial viscosity, it is necessary to add a supplement of solvent.

By adding less solvent than is required to restore the initial viscosity, the process according to this invention makes it possible to increase the viscosity of a varnish, while prolonging its stability in the liquid state. In practice the quantity of supplementary solvent depends on the desired grade of varnish and on the purpose for which it is to be employed.

The invention includes the possibility of directly preparing an organo-polysiloxane resin of a higher degree of polymerisation, from monomer or slightly polymerised organo-silicic compounds, without passing through an intermediate varnish. In this case, instead of interrupting the heating when reaching the degree of polymerisation permitting to dissolve the resin in the solvent, heating is continued until a degree of polymerisation is reached which corresponds to a resin forming with the solvent a gel capable of being degelified as described above. The process described is of advantage in all cases where the formation of polymerised organo-polysiloxanes takes place in the absence of catalysts or of other substances which must be removed from the resin before the varnish is prepared. Thus the preparation of an intermediate varnish, which must be decomposed in order to subject the resin to a supplementary polymerisation, may be dispensed with, when the organo-polysiloxanes are obtained by means of processes comprising hydrolysis of organo-silicic compounds.

When carrying out processes of preparing organo-silicic resins in presence of catalysts, it is advisable to stop polymerisation at a moment where the resins still possess a degree of fluidity sufficient to permit the removal of the catalyst, for example by washing with water. The supplementary polymerisation is then effected after this intermediate operation without or with only a transient intervention of solvents.

The process according to the invention moreover permits of making use of resins which have gone beyond the required degree of polymerisation or of varnishes which have been gelified unintentionally.

The varnishes obtained according to this invention, when applied in a thin layer, give after baking smooth, hard, transparent and strong films. However, if degelification has not been complete, the films may be more or less opaque. This fact is of no importance with pigment containing varnishes. Anyhow a degelifying grinding of sufficient intensity, makes it possible to obtain varnishes capable of giving transparent layers, at least if polymerisation of the resins has not been pushed too far.

The following examples relate to some manners of carrying out the present invention, which, however is not limited thereto. They also give indications on the properties of varnishes obtained by the process described:

*Example 1*

500 gr. of a varnish made from organo-polysiloxanes having at 20° C. a viscosity of 40 cps. measured on the Gardner scale, containing in toluene solution 60% of quick polymerising methyl-phenyl resin with a ratio R/Si=1.75 prepared by reaction between substituted ethoxysilanes and substituted chlorosilanes in presence of an aluminium chloride catalyst, were heated in a vessel provided with a distillation column, until the solvent was eliminated. The resin was polymerised and was finally gelified by heating for several hours at 200° C., whereupon the quantity of solvent eliminated was returned thereto. The resin absorbs the solvent and swells without dissolving therein. This gel was then liquefied by subjecting it for ½ hour to the action of a turbine agitator and then for about 15 minutes to the action of a colloidal mill. The resulting product was a varnish having the same weight as the initial varnish. Its viscosity measured under the same concentration and temperature conditions as for the initial varnish, is 380 cps.

For practical applications, this varnish has been diluted up to a concentration of 50%. The layers of varnish obtained from this solution on glass plates were hard, smooth and transparent.

*Example 2*

A varnish similar to that used in Example 1, with a R/Si ratio=1.6, containing 80% organo-polysiloxanes resin has been spontaneously gelified after being preserved for 11 months. After having added toluene in order to bring the resin concentration down to 60%, degelification by means of a turbine agitator and of grinding rollers, permitted to obtain a colloidal solution of a viscosity of 420 cps. in a 60% solution.

This varnish at a concentration of 60%, when applied on a glass plate, has given a smooth, hard and fairly transparent layer. Applied with a 20% resin concentration, the varnish has given a smooth, hard and opaque layer. The 60% resin varnish pigmented with 30% aluminium powder has given on glass a hard and smooth layer of paint.

*Example 3*

A mixture containing 149.4 gr. of methyltrichlorosilane, 129 gr. dimethyldichlorosilane, 211.5 gr. phenyltrichlorosilane and 253 gr. diphenyldichlorosilane is diluted with an equal volume of toluene, then with the same volume of ether, the whole being slowly poured into a 10 litres vessel containing 4 litres water, 1 kg. crushed ice, 1 litre toluene and 1 litre ether. The vessel is provided with a rapidly rotating agitator.

After introducing the chlorosilanes, the mixture is agitated for 1 hour and is repeatedly washed with water until the hydrochloric acid formed is completely eliminated. Water is separated and the solution of the hydrolysed organo-silicic compound is dried on calcium chloride.

After eliminating ether and toluene by distillation, 398 gr. of resin is obtained. When dissolved in toluene up to 60% resin, the solution has a viscosity under 50 cps.

The varnish thus obtained is then introduced into a vessel having a reflux cooler and it is thus heated (the starting temperature of the liquid being 115° C.) for 26 hours until gelification sets in. Heating is then stopped, the product is diluted with toluene up to a 50% concentration and the mixture is ground for 48 hours in a porcelain bowl grinder. There is obtained a colloidal solution of varnish having a viscosity of 300 cps. which, after baking, gives hard, smooth and slightly opaque films.

*Example 4*

A varnish of organo-polysiloxanes formed by a solution of a methyl-phenyl resin with R/Si ratio=1.70 has been heated up to 150° C. in a vessel under depression of 20 mm. Hg in order first to evacuate the solvent and then a portion of the volatile organo-silicic substances, in order to increase the viscosity of the organo-polysiloxanes resin. A portion of the resin obtained was dissolved in toluene to form an 80% resin varnish hereafter designated as A.

Another portion of the resin was solely heated up to 250° C. and maintained at that temperature for about 1 hour. It was transformed into a gelatinous mass insoluble in the solvent, after having added toluene to form a 58% resin gel. By grinding by means of a turbine agitator and then of a colloidal mill, a varnish was obtained which is hereafter designated as B. The properties of both varnishes are shown in the following tables:

(a) Viscosity:
 Varnish A at 25° C. in toluene solution containing 80% resin: 165 cps.
 Varnish B at 25° C. in toluene solution containing 58% resin: 600 cps.

(b) Hardness after baking (König method):

| time of baking | 30 minutes | 60 minutes | 90 minutes |
|---|---|---|---|
| König indice: | | | |
| Varnish A | 223 | 283 | 312 |
| Varnish B | 280 | 310 | 301 |

Baking therefore is more rapid for varnish B.

(c) Thickness of the layer: The thickness of the layer was measured at a distance of 1 cm. and at a distance of 6 cm. from the upper edge of a glass plate held in vertical position during the application and the baking of the varnish. The ratio R of the thickness of the layers was determined and is indicated hereunder in microns:

| | Distance | | |
|---|---|---|---|
| | 1 cm. $a$ | 6 cm. $b$ | $R=\dfrac{b}{a}$ |
| Varnish A | 15 | 32 | 2.14 |
| Varnish B | 210 | 270 | 1.28 |

It is seen that the thickness of the layer is more uniform in the case of varnish B than in the case of varnish A.

We claim:

1. A process of preparing from a hydrocarbon substituted polysiloxane, a liquid suitable for use as a varnish which comprises, subjecting to intimate grinding in the presence of absorbed hydrocarbon solvent, a hydrocarbon-substituted polysiloxane gel having a R:Si ratio within the range of about 1.6 to 1.75, wherein R is the hydrocarbon radical, said polysiloxane gel being too highly polymerized to dissolve in said hydrocarbon solvent, said grinding transforming said polysiloxane gel into said liquid.

2. A process of preparing a varnish from a hydrocarbon substituted polysiloxane having a R:Si ratio within the range of about 1.6 to 1.75, wherein R is the hydrocarbon radical, said polysiloxane being too highly polymerized to dissolve in a hydrocarbon solvent for said hydrocarbon-substituted polysiloxane in the unpolymerized or slightly polymerized form, which comprises subjecting said highly polymerized hydrocarbon-substituted polysiloxane to gelification in the presence of said hydrocarbon solvent, and then transforming said gel into a liquid by an intimate grinding thereof in the presence of absorbed solvent.

3. A process of preparing from a hydrocarbon substituted polysiloxane a liquid composition suitable for use as a varnish, which comprises subjecting to intimate grinding in the presence of absorbed aromatic solvent, a hydrocarbon-substituted polysiloxane gel having an R:Si ratio of about 1.7, wherein R is the hydrocarbon radical, said polysiloxane gel being too highly polymerized to dissolve in said aromatic solvent, said grinding transforming said polysiloxane gel into said liquid composition.

References Cited in the file of this patent

UNITED STATES PATENTS

| 2,271,804 | Root | Feb. 3, 1942 |
| 2,392,713 | Wright et al. | Jan. 8, 1946 |
| 2,442,196 | Coggeshall | May 25, 1948 |
| 2,542,334 | Hyde | Feb. 20, 1951 |
| 2,575,912 | Doyle | Nov. 20, 1951 |

FOREIGN PATENTS

| 585,991 | Great Britain | Mar. 4, 1947 |